(12) United States Patent
Zhang et al.

(10) Patent No.: US 8,081,268 B2
(45) Date of Patent: Dec. 20, 2011

(54) LIQUID CRYSTAL DISPLAY ASSEMBLY

(75) Inventors: Bo Zhang, Shenzhen (CN); Cheng-Ho Yen, Taipei Hsien (TW); Xian-Sheng Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 369 days.

(21) Appl. No.: 12/422,252

(22) Filed: Apr. 11, 2009

(65) Prior Publication Data
US 2010/0073595 A1 Mar. 25, 2010

(30) Foreign Application Priority Data
Sep. 24, 2008 (CN) .......................... 2008 2 0302215

(51) Int. Cl.
*G02F 1/1333* (2006.01)
(52) U.S. Cl. ........................................................ 349/59
(58) Field of Classification Search ..................... 349/59
See application file for complete search history.

(56) References Cited

U.S. PATENT DOCUMENTS

| 7,436,668 B2 * | 10/2008 | Bae .............................. 361/704 |
| 2003/0011736 A1 * | 1/2003 | Ha et al. ......................... 349/149 |
| 2006/0203174 A1 * | 9/2006 | Ha et al. ......................... 349/149 |
| 2009/0135329 A1 * | 5/2009 | Kim .............................. 349/58 |
| 2009/0284681 A1 * | 11/2009 | Inoue ............................. 349/58 |

* cited by examiner

*Primary Examiner* — Sung Pak
(74) *Attorney, Agent, or Firm* — Altis Law Group, Inc.

(57) ABSTRACT

A liquid crystal display assembly includes an enclosure including an opening, a lens received in the opening, a printed circuit board (PCB) mounted in the enclosure, a shielding frame mounted on the PCB, a liquid crystal module electrically connected to the PCB and mounted inside the shielding frame, and a double-sided tape that attaches the shielding frame to the enclosure and the lens. A length, a thickness, and a width of the lens are substantially equal to a length, a thickness, and a width of the opening of the enclosure. The shielding frame protects the liquid crystal module from electromagnetic interference. The lens is directly supported by the shielding frame.

4 Claims, 2 Drawing Sheets

LIQUID CRYSTAL DISPLAY ASSEMBLY

BACKGROUND

1. Technical Field

The present disclosure generally relates to display technology, and more particularly to a liquid crystal display (LCD) assembly.

2. Description of Related Art

Communication devices, such as personal digital assistants (PDA), mobile phones, and so on, often utilize a liquid crystal display (LCD) to provide information. A frequently used communication device includes an enclosure including a mount on which a lens of the liquid crystal display is mounted, resulting in increasing device thickness and hampering efforts toward minimizing device profile.

Therefore, a need exists in the industry to overcome the described limitations.

DETAILED DESCRIPTION

Figure 1:
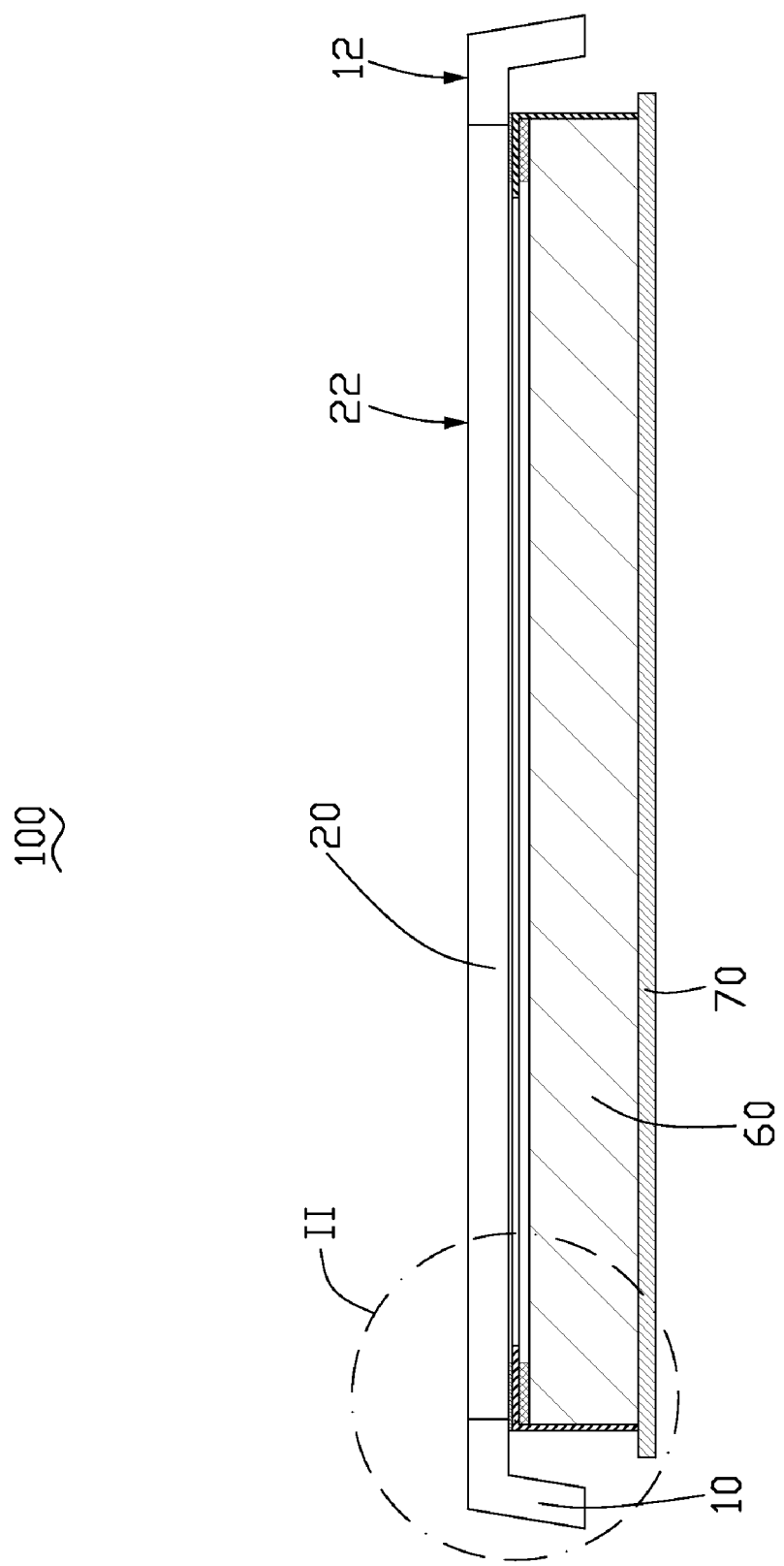
FIG. 1 is an assembled, cross-sectional view of a liquid crystal display (LCD) assembly of an exemplary embodiment of the disclosure.
Figure 2:
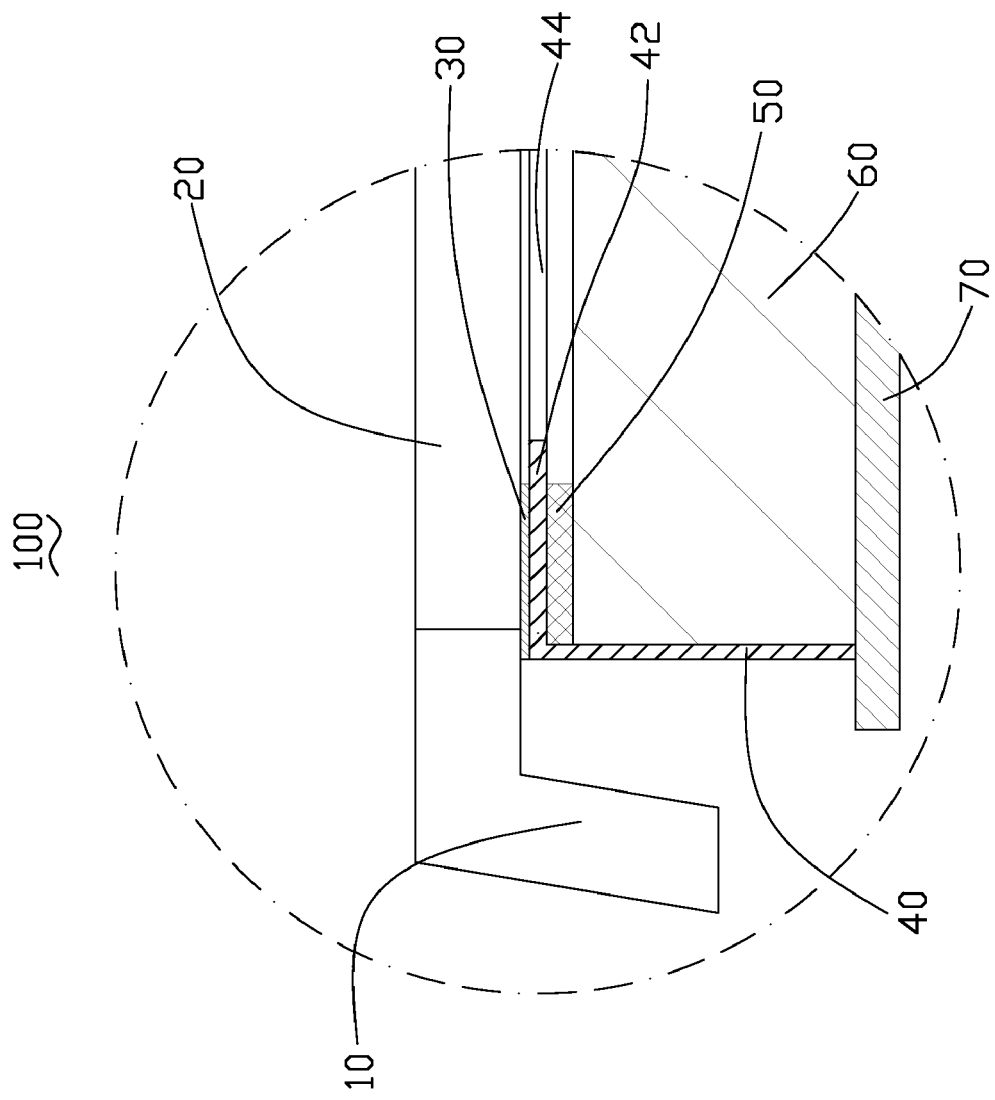
FIG. 2 is an enlarged view of a circle portion II of FIG. 1.

Referring to FIGS. 1-2, a liquid crystal display (LCD) assembly 100 of a communication device is disclosed. The LCD assembly 100 includes an enclosure 10, a lens 20, a double-sided tape 30, a shielding frame 40, a foam 50, a liquid crystal module (LCM) 60, and a printed circuit board (PCB) 70 fixed in the enclosure 10. The communication device as disclosed is a mobile phone or personal digital assistant (PDA), but the disclosure is not limited thereto.

The enclosure 10 accommodates the lens 20, the shielding frame 40, the foam 50, the LCM 60, and the PCB 70. Here, the enclosure 10 is substantially rectangular and it will be understood that other configurations may be utilized with equal applicability. The enclosure 10 defines an opening (not labeled) for receiving the lens 20. In the illustrated embodiment, the lens 20 is made of glass, plastic, or other transparent material. A length, a thickness, and a width of the opening of the disclosure 10 are substantially equal to a length, a thickness, and a width of the lens 20.

The shielding frame 40 is mounted on the PCB 70 to protect the LCM 60 from electromagnetic interference (EMI) and includes a cover 42 defining an aperture 44. A length and a width of the aperture 44 is smaller than a length and a width of the lens 20. In the illustrated embodiment, the shielding frame 40 is soldered on the PCB 70.

The LCM 60 is mounted in the shielding frame 40 and electrically connected to the PCB 70. Information displayed on the LCM 60 is viewable via the aperture 44 and the lens 20.

The foam 50 is positioned between the cover 42 of the shielding frame 40 and the LCM 60 to protect the LCM 60 from impact damage without obscuring the aperture 44 of the cover 42.

The double-sided tape 30 attaches the shielding frame 40, the enclosure 10, and the lens 20, completing assembly of the enclosure 10, the lens 20, the shielding frame 40, the foam 50, and the LCM 60 into the LCD assembly 100. In this position, an exterior surface 22 of the lens 20 substantially aligns with an exterior surface 12 of the enclosure 10, and the lens 20, that is received in the opening of the enclosure 10, is substantially unmovable after assembly.

Because the lens 20 is received in the opening of the enclosure and directly supported by the shielding frame 40, the enclosure 10 requires no additional structure or elements to support the lens 20, with thickness of the liquid crystal display assembly 100 significantly being conserved.

While an embodiment of the present disclosure has been described, it should be understood that it has been presented by way of example only and not by way of limitation. Thus the breadth and scope of the present disclosure should not be limited by the above-described exemplary embodiments, but should be defined only in accordance with the following claims and their equivalents.

What is claimed is:

1. A liquid crystal display (LCD) assembly comprising:
    an enclosure defining an opening;
    a lens received in the opening of the enclosure, the lens having a length, a thickness, and a width thereof substantially equaling a length, a thickness, and a width of the opening;
    a printed circuit board (PCB) mounted in the enclosure;
    a shielding frame mounted on the printed circuit board;
    a liquid crystal module electrically connected to the PCB and mounted inside the shielding frame, wherein the shielding frame protects the liquid crystal module from electromagnetic interference; and
    a double-sided tape that attaches the shielding frame to the enclosure and the lens; wherein the lens is directly supported by the shielding frame.

2. The liquid crystal display assembly as recited in claim 1, further comprising a foam mounted inside of the shielding frame, to protect the liquid crystal module.

3. The liquid crystal display assembly as recited in claim 1, wherein the shielding frame comprises a cover defining an aperture, wherein the foam is positioned between the cover and the liquid crystal module without obscuring the aperture.

4. The liquid crystal display assembly as recited in claim 1, wherein an exterior surface of the lens substantially aligns with an exterior surface of the enclosure.

\* \* \* \* \*